US007921702B2

(12) United States Patent
Williams et al.

(10) Patent No.: US 7,921,702 B2
(45) Date of Patent: Apr. 12, 2011

(54) METHOD FOR IDENTIFYING ANOMALOUS BEHAVIOUR OF A DYNAMIC SYSTEM

(75) Inventors: Edward Williams, London (GB); Evrin Erdem, London (GB)

(73) Assignee: Delphi Technologies Holding S,nrl, Troy, MI (US)

( * ) Notice: Subject to any disclaimer, the term of this patent is extended or adjusted under 35 U.S.C. 154(b) by 1217 days.

(21) Appl. No.: 11/546,653

(22) Filed: Oct. 12, 2006

(65) Prior Publication Data

US 2007/0124183 A1 May 31, 2007

(51) Int. Cl.
*G01M 15/04* (2006.01)
(52) U.S. Cl. .................................................... 73/114.43
(58) Field of Classification Search ................ 73/114.43
See application file for complete search history.

(56) References Cited

U.S. PATENT DOCUMENTS

| | | | | |
|---|---|---|---|---|
| 5,787,868 | A * | 8/1998 | Maki et al. | 123/681 |
| 6,016,791 | A * | 1/2000 | Thomas et al. | 123/497 |
| 6,076,504 | A * | 6/2000 | Stavnheim et al. | 123/447 |
| 6,105,554 | A * | 8/2000 | Nishiyama | 123/436 |
| 6,234,148 | B1 | 5/2001 | Hartke et al. | |
| 6,449,944 | B1 * | 9/2002 | Yasui et al. | 60/277 |
| 6,497,223 | B1 * | 12/2002 | Tuken et al. | 123/497 |
| 7,010,415 | B2 * | 3/2006 | Dolker | 701/107 |
| 7,328,689 | B2 * | 2/2008 | Achleitner et al. | 123/446 |
| 2008/0009987 | A1 * | 1/2008 | Williams et al. | 701/31 |
| 2009/0205413 | A1 * | 8/2009 | Yamauchi et al. | 73/114.41 |

FOREIGN PATENT DOCUMENTS

| | | | |
|---|---|---|---|
| DE | 10003298 | * | 8/2001 |
| EP | 1106800 | | 6/2001 |

OTHER PUBLICATIONS

EP Communication dated Jun. 23, 2009.

* cited by examiner

*Primary Examiner* — Freddie Kirkland, III
(74) *Attorney, Agent, or Firm* — Thomas N. Twomey

(57) ABSTRACT

The invention provides, particularly although not exclusively in the context of a fuel injection system of a compression-ignition internal combustion engine, a method for detecting anomalous behaviour of a dynamic system (40), the method including i) determining a system model including plurality of characteristic parameters to define the dynamic system (40), ii) calculating one or more metrics indicative of the current system performance based on the plurality of characteristic parameters, iii) comparing the one or more derived metrics with one or more predetermined metrics indicative of anomalous system behaviour and iv) identifying a predetermined system fault condition if one or more of the derived metrics corresponds to one or more of the predetermined metrics. The invention also provides an apparatus for implementing the aforesaid method.

12 Claims, 4 Drawing Sheets

METHOD FOR IDENTIFYING ANOMALOUS BEHAVIOUR OF A DYNAMIC SYSTEM

TECHNICAL FIELD

The present invention relates to a method of detecting and identifying anomalous behavior of a dynamic system. More particularly, although not exclusively, the invention relates to a method of detecting and identifying anomalous behavior of a common rail fuel supply system in a compression-ignition internal combustion engine. Also, the invention relates to an apparatus for implementing the aforesaid method.

BACKGROUND ART

Fuel injection systems based on common rail technology provide important advantages to engine and vehicle manufacturers who are under continual pressure by environmental regulatory bodies to reduce the pollution caused by the engine whilst improving the performance of the vehicle offered to the end user.

Principally, common rail technology enables the amount of fuel delivered to the combustion cylinders of the engine to be controlled precisely whilst providing high pressure injection and flexible injection timing. Important advantages are thus gained in terms of fuel economy and emissions. However, in order to operate efficiently, it is important that the pressure of fuel within the common rail is controlled accurately to a desired pressure level despite any disturbances that may be caused to the system.

In use, the relationship between the fuel pressure within the common rail (hereafter 'rail pressure') in response to the amount of fuel pumped into the common rail by a high pressure supply pump is a dynamic system. Typically, therefore, the high pressure fuel pump is controlled by a combination of open-loop and closed-loop control in order to fulfill the functional requirements of i) maintaining the desired rail pressure during changes of injection quantity, ii) varying the rail pressure in response to a change in pressure demand quickly and accurately, and iii) being resilient to system disturbances such as changes in fuel viscosity due to variations in temperature and fuel grade.

Although it is possible to control the pressure of fuel within the rail accurately and robustly using a combination of open-loop and control-loop control strategies, the Applicant has identified a need to provide a means to identify and characterize possible system faults and anomalous system behavior in a cost effective manner.

DISCLOSURE OF THE INVENTION

It is against this background that the invention provides, from a first aspect, method for detecting anomalous behavior of a common rail fuel supply system of an internal combustion engine including a pressurized common rail fuel volume arranged to receive fuel from a pumping arrangement and to supply pressurized fuel to a plurality of fuel injectors, the method including i) determining a system model including a plurality of characteristic parameters to define a common rail pressure value in response to the amount of fuel pumped into the common rail, ii) calculating one or more metrics indicative of the current system performance based on the plurality of characteristic parameters, iii) comparing the one or more derived metrics with one or more predetermined metrics indicative of anomalous system behavior, and iv) identifying a predetermined system fault condition if one or more of the calculated metrics corresponds to one or more of the predetermined metrics.

Since the combination of the pumping means and the common rail constitute a dynamic system, preferably the system is controlled by means of a system controller based on a plurality of predetermined control parameters. The system controller ensures that the actual pressure of fuel within the common rail is substantially equal to a value of demanded rail pressure, as determined by an engine control unit, despite system disturbances such as a change in the fuelling requirement.

In order to improve the performance of the system controller, the method may include calculating new system control parameters based on the characteristic parameters of the system and updating the predetermined system control parameters with the new system control parameters. It is preferred that the step of determining a system model occurs in real time during normal operation of the system such that the system model is updated repeatedly to adapt to external influences on the system such as mechanical wear and tear of fuel injection equipment components and changes in fuel temperature.

In the preferred embodiment of the invention, the system is a delayed first order system having the characteristic parameters T (time constant), K (steady state gain) and L (lag time). The invention recognizes that the characteristic parameters of the system may vary over time and that, by performing online system identification, the characteristic parameters and their associated rates of change may be measured and compared with one or more expected values in order to detect any abnormal behavior of the system.

It should be noted that the term 'predetermined metric' refers to a predetermined value relating to some aspect of engine operation which is then compared to a measured value for the metric in order to determine whether there is a fault condition. For example, if the steady state gain, K, drops from relatively high value to a relatively low value in the course of several seconds (high rate of change of K), this will indicate that a serious fuel leak has developed within the system and that the pressure of fuel in the common rail cannot be maintained at the desired level.

In the context of an operational internal combustion engine, the invention provides a means to monitor the fuel injection system of the engine for any anomalous behavior patterns which may indicate that maintenance action is required. By monitoring the way in which the characteristic parameters of the system vary over time and comparing the data with predetermined metrics that are indicative of anomalous conditions, the invention provides an elegant solution to the problem of monitoring the system behavior and identifying potential faults. Advantageously, the invention does not require any complex hardwired sensor systems distributed throughout the engine, thus reducing the complexity and overall cost of the engine installation. As well as identifying immediate faults, the invention also provides a means by which maintenance events for engine components may be predicted.

Preferably, following the identification of faults or anomalous behavior an alerting step is triggered in which a visible and/or audible alert is provided to the operator of the vehicle such that appropriate action may be taken. In addition, or as an alternative, the alerting step may trigger a change in engine power mode (limp-home mode).

The invention also provides a computer program product comprising at least one computer program software portion which, when executed in an execution environment, is operable to implement the above described method. Preferably, the computer program software portion and the execution environment are constituted by firmware, for example, an electronic engine control unit of a vehicle in which the method of the invention is implemented.

The invention also resides in a data storage medium having the or each computer program software portion stored thereon.

According to a second aspect, the invention provides an apparatus for detecting anomalous behavior of a dynamic system, the apparatus including i) system identification means for determining a system model including a plurality of characteristic parameters to define the system model, ii) calculation means to calculate one or more metrics indicative of the current performance of the system based on the plurality of characteristic parameters, iii) storage means to store one or more predetermined metrics that are indicative of anomalous system behavior, iv) comparison means for comparing the one or more predetermined metrics with the one or more calculated metrics, and v) means for identifying that one or more of the calculated metrics corresponds to one or more of the predetermined metrics.

It will be appreciated that preferred and/or optional features of the method of the first aspect of the invention may be implemented by features of the second aspect of the invention.

BRIEF DESCRIPTION OF THE DRAWINGS

In order that the invention may be more readily understood, reference will now be made, by way of example only, to the accompanying drawings in which.

DETAILED DESCRIPTION OF PREFERRED EMBODIMENTS

Figure 1:
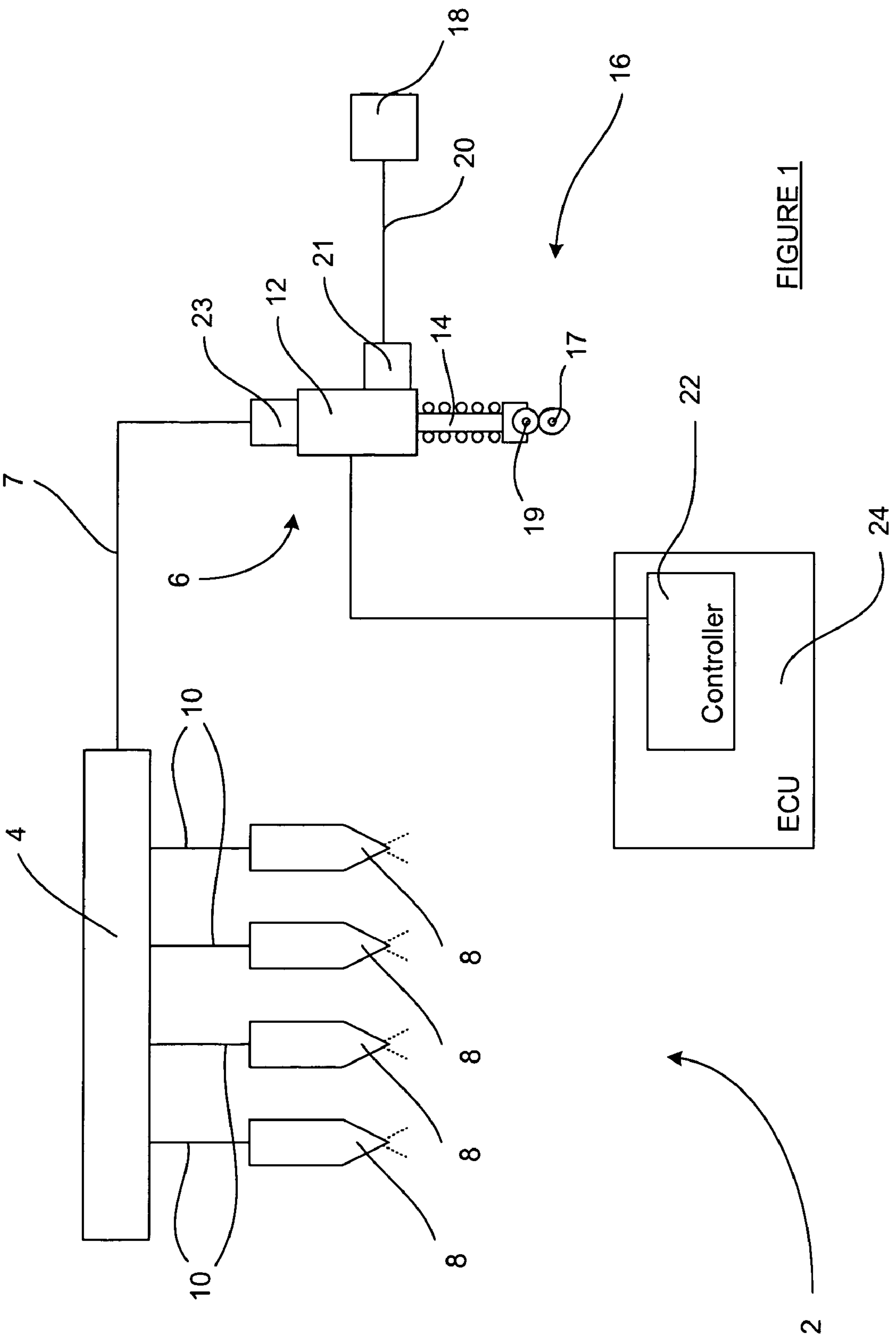
FIG. 1 is a schematic diagram of a fuel injection system to which the invention is applied.

FIG. 1 is a schematic diagram of a fuel injection system 2 that is simplified for the purpose of this specific description and within which the present invention may be incorporated. The fuel injection system 2 includes an accumulator volume in the form of a common rail 4 that is supplied with pressurized fuel from a high pressure rail supply pump, in the form of a unit-pump 6, via a high pressure fuel pipe 7. It should be noted that the unit-pump 6 is not shown in detail in FIG. 1 since it is not essential for understanding of the invention and the configuration of such a unit-pump 6 would be well known to the skilled reader. The common rail 4 is fluidly connected to four fuel injectors 8 by respective high pressure fuel supply pipes 10. The fuel injectors are controlled electronically to deliver fuel to an associated combustion cylinder of the engine (not shown).

The unit-pump 6 includes a pumping module 12 defining a pumping chamber (not shown) within which fuel is pressurized by an associated pumping plunger 14. The pumping plunger 14 is driven in a reciprocating motion to perform an inward, pumping stroke, and an outward, return stroke, by a cam-drive arrangement 16. In a known manner, the cam-drive arrangement 16 includes a driven cam shaft 17 having a cam surface that acts upon a roller/shoe arrangement 19 associated with the pumping plunger 14. Although only one unit-pump 6 is shown in FIG. 1 for simplicity, it should be noted that one or more of such pumps may be provided depending on the requirements of the engine installation.

The pumping chamber of the unit-pump 6 is supplied with relatively low pressure fuel from a transfer pump 18 via a low pressure supply pipe 20 and non-return valve 21. Low pressure fuel is therefore able to fill the pumping chamber when the pumping plunger 14 performs a return stroke ready for fuel pressurization. As the cam-drive arrangement 16 drives the pumping plunger 14 on a pumping stroke, the pumping plunger 14 reduces the volume of the pumping chamber and so the fuel trapped therein is pressurized.

The pumping module 12 is provided with a rail control valve 23 which controls whether or not the pumping chamber communicates with the common rail 4 and thus controls the flow of pressurized fuel thereto. In order to control the volume of fuel that is supplied to the common rail 4, control means in the form of a unit-pump controller 22 (hereinafter 'the controller') is provided, the functionality of which forms part of an engine control unit 24 (hereinafter 'the ECU'). The controller 22 is electrically connected to the unit-pump 6 and supplies electronic signals to the rail control valve 23.

In order to supply pressurized fuel to the common rail 4, the controller 22 causes the rail control valve 23 to transition from an open state to a closed state during the return stroke of the plunger thus breaking communication between the pumping chamber and the common rail 4. A relative vacuum will therefore be drawn in the pumping chamber which will cause the non-return valve 21 to open so as to permit fuel at transfer pressure to fill the pumping chamber. At the end of a plunger return stroke, the non-return valve 21 will close thus preventing fuel from flowing back to low pressure from the pumping chamber. During the pumping phase of the pumping plunger 14, fuel trapped within the pumping chamber is pressurized until such time as the controller 22 causes the rail control valve 23 to open so as to permit pressurized fuel to flow from the pumping chamber to the common rail 4. By controlling the point at which the rail control valve opens during the pumping stroke of the pumping plunger 14, the controller 22 determines the effective stoke of the pumping plunger 14 for which pressurized fuel is supplied to the common rail 4 from the unit-pump 6. The electronic signal necessary to control the rail control valve 23 is known as the 'filling pulse' and is measured as degrees of rotation of the cam-shaft 17 that drives the unit-pump 6.

During operation of the fuel injection system, it is important that the pressure of fuel within the common rail 4 remains as close as possible to a specific demanded rail pressure that is set by the ECU 24. To achieve this, the controller 22 utilizes negative feedback control to modulate the filling pulse appropriately so as to ensure the actual rail pressure equals the demanded rail pressure despite disturbances that may affect the system. The process by which the controller 22 maintains the fuel pressure within the common rail 4 at the demanded rail pressure will now be described with reference to FIG. 2.

Figure 2:
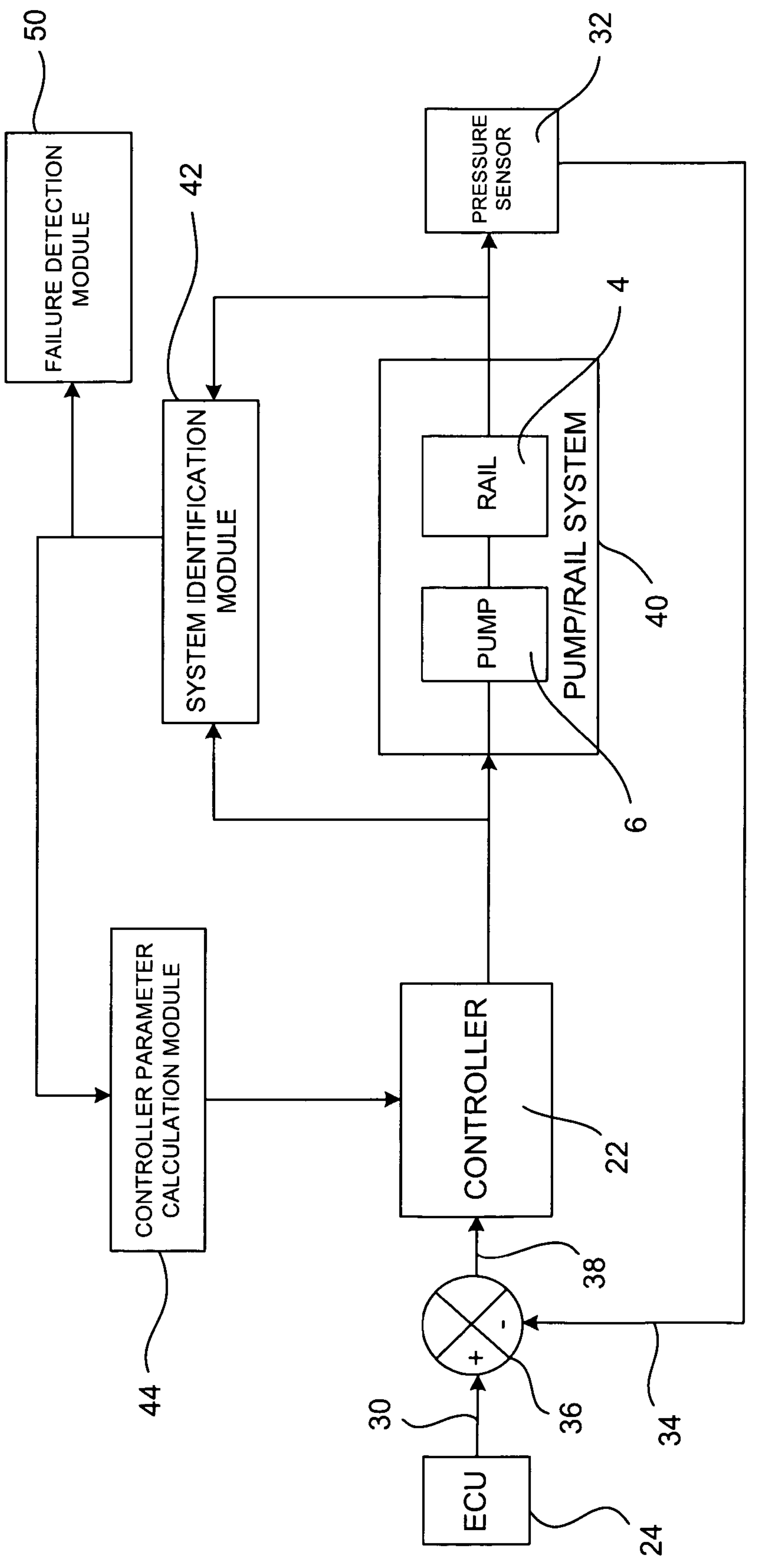
FIG. 2 is a functional block diagram of the fuel system in FIG. 1 and an associated rail pressure control system.

In FIG. 2, the ECU 24 outputs a rail pressure demand signal 30, that is determined based upon the prevailing operating conditions of the engine, to the controller 22 via a summing junction 36. For example, the ECU 24 will output a comparatively high rail pressure demand signal 30 when the engine is operating under a high engine load/speed condition as compared to a relatively low rail pressure demand signal 30 when the engine is at an idle operating condition.

A pressure sensor 32 mounted to the common rail 4 measures the actual pressure of fuel in the common rail 4 and outputs a feedback signal 34 that is subtracted from the rail pressure demand signal 30 at the summing junction 36. The output signal of the summing junction 36 is provided as an input to the controller 22 and represents the difference between the demanded common rail pressure and the actual common rail pressure. The output of the summing junction 36 shall hereinafter be referred to as 'the pressure error signal' 38. The function of the controller 22 is to calculate a filling pulse signal to control the rail control valve 23 of the unit-pump 6 so as to cause the pressure of fuel within the common rail 4 to substantially correspond to the demanded rail pressure, so that the pressure error signal 38 is substantially equal to zero.

It should be mentioned at this point that FIG. 2 represents a simplified system and that, in a practical embodiment, the controller 22 provides a contributory filling pulse input to the unit-pump 6. Further filling pulse signal components would also be provided, for example via open loop or feed forward control functions, to compensate for fuel system losses such as the amount of fuel that is currently being injected.

The unit-pump 6 and the common rail 4 together constitute a dynamic pump/rail system 40 which is initially modeled prior to engine installation in order to derive a mathematical model defining the variables that describe the state of the system as a function of time. Such a mathematical model is referred to as a 'transfer function' and would be well known to the skilled reader. The transfer function is used to calculate the P, I and D controller parameters prior to engine installation such that the pump/rail system 40 is controlled acceptably when the engine is operated for the first time.

In the embodiment described, the controller 22 is a three-term controller having a proportional gain value 'P', an integral gain value 'I' and a derivative gain value 'D'. Such a three-term controller is typically referred to as a 'PID' controller and its functionality would be familiar to the skilled reader.

Figure 3:
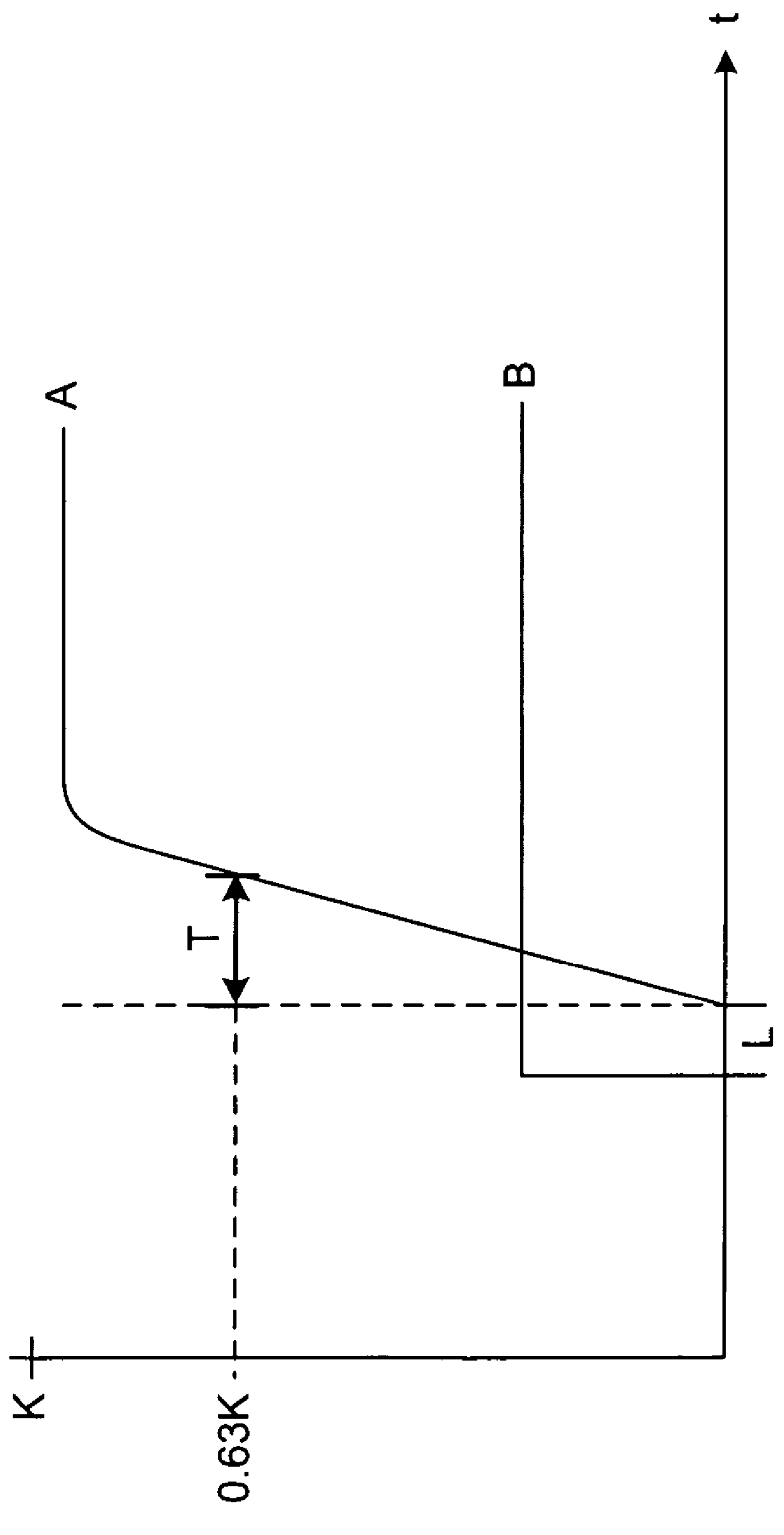
FIG. 3 is a graphical representation of the output of a first order transfer function in response to a step change input.

In this embodiment, the transfer function of the pump/rail system is a delayed first order function having three specific parameters that define the characteristic response of the system to an input: a steady state gain value 'K'; a time constant value 'T'; and a lag time value 'L'. By way of explanation, a characteristic first order system is shown in FIG. 3, which illustrates the actual rail pressure 'A' in response to a step-change in filling pulse 'B'. The steady state gain K is the ratio of the actual rail pressure A at steady state conditions to the filling pulse input B. The time constant T is the time taken for the actual rail pressure to reach 63% of the demanded rail pressure following a step change in demanded rail pressure. The lag time L is the time period between the start of the step change input and the start of the rise in common rail pressure.

Referring once again to FIG. 2, although the characteristic parameters of the pump/rail system 40 are initially modeled prior to engine installation, the invention provides an online system identification means in the form of a system identification module 42 and a controller parameter calculation means in the form of a controller parameter calculation module 44 (hereinafter 'calculation module') for modifying the parameters of the controller 22 online in order to compensate for changes in the response characteristics of the pump/rail system 40.

The system identification module 42 is implemented online, that is to say during normal operation of the engine, continuously at predetermined periods in synchronization with a pseudo random binary input sequence of filling pulses (hereafter 'PRBS') that is input to the pump/rail system 40 by the controller 24. The skilled reader will be familiar with the principles of applying a pseudo random binary sequence as an input signal to a system so further explanation is omitted here.

In order to calculate the characteristic parameters of the pump/rail system 40, the system identification module 42 monitors the PRBS signal that is input to the unit-pump 6 and the actual rail pressure that is measured by the rail pressure sensor 32. Since the PRBS input signal comprises a set of known input stimuli, the system identification module 42 compares the response of the actual common rail fuel pressure to the known stimuli and calculates revised characteristic parameters of K, T and L for the pump/rail system 40.

The system identification module 42 communicates electronically with the controller parameter calculation module 44 which, in turn, communicates with the controller 22. The calculation module 44 receives the revised system parameter values K, T and L from the system identification module 42 and calculates new P, I and D values for the controller 22.

In addition to communicating with the calculation module 44, the system identification module 42 also transmits the new characteristic parameter values K, T and L to a failure detection module 50, the functionality of which will now be described.

Figure 4:
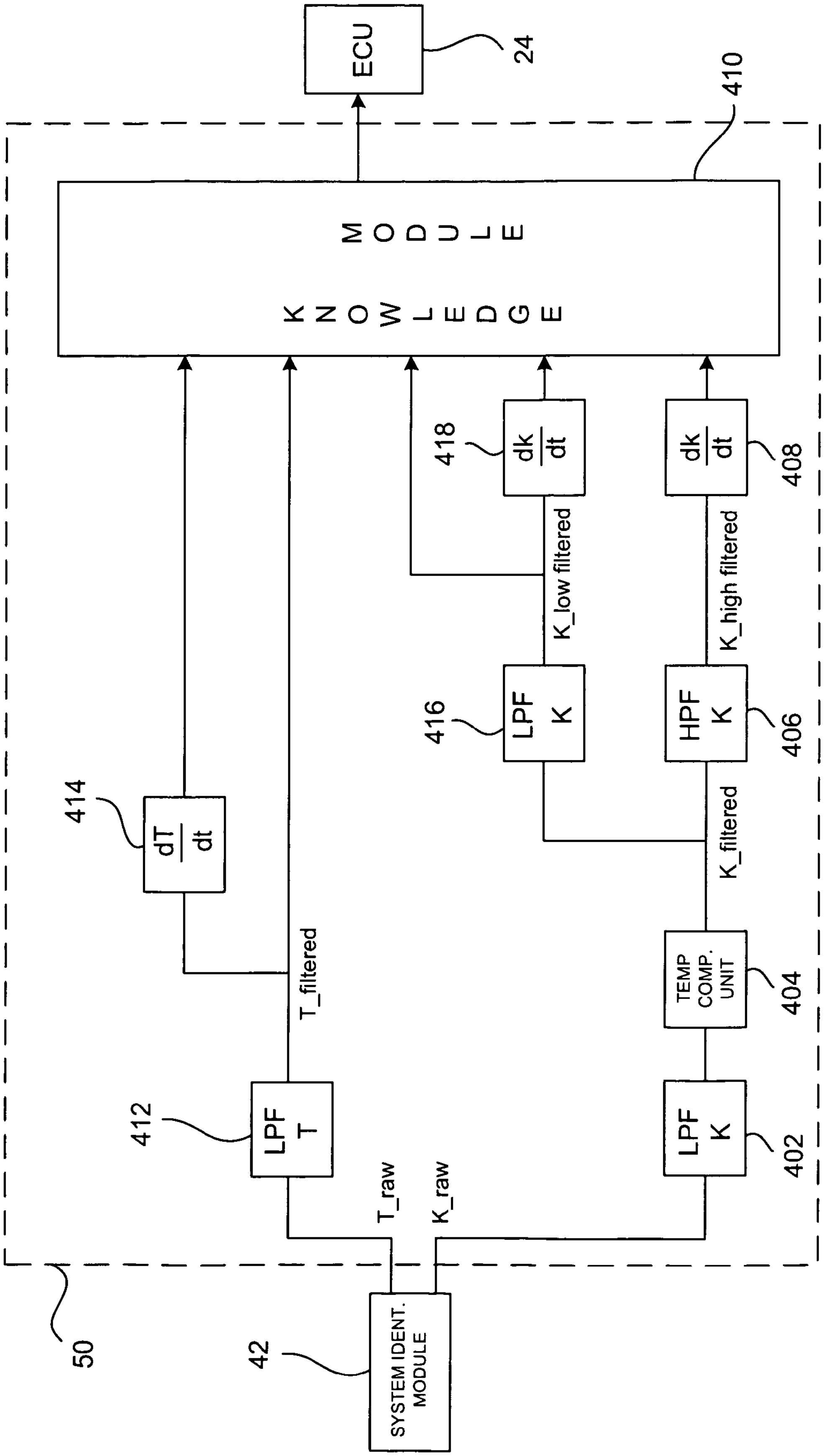
FIG. 4 is a functional flow diagram as implemented by a failure detection module of the system in FIG. 2.

The failure detection module 50 monitors the incoming flow of data from the system identification module 42, namely the characteristic parameters K, T, and L, and performs calculations in order to identify certain phenomena associated with the system. The embodiment of the invention described herein is particularly concerned with the identification of two types of phenomenon: quantification of mechanical wear and the occurrence of ruptured high pressure pipe work. Referring to FIG. 1, for example, the high pressure fuel supply pipe 5 connecting the unit-pump 6 and the common rail 4 or the high pressure supply pipes 10 connecting the common rail 4 to the injectors 8 may crack or burst such that fuel leaks from the common rail at an uncontrolled rate which compromises the ability of the controller 22 to maintain the fuel pressure in the common rail 4 at a desired level. The detection of the aforesaid phenomenon is discussed below with reference to FIG. 4.

Detection of a Burst Fuel Supply Pipe

A fuel supply pipe typically fails in one of two ways. Firstly a crack may develop in a fuel supply pipe such that high pressure fuel leaks from the crack gradually. Alternatively, the crack may burst suddenly such that fuel escapes from the common rail at a high rate. In either case, it is important to identify such a failure promptly so that appropriate action may be taken, for example shutting down the engine, to avoid irreparable damage to engine components.

In order to detect such failures, the raw data from the system identification module 42 is separated into two data streams, namely raw values of the steady state gain K (hereinafter 'K_raw') and the time constant T (hereinafter 'T_raw'). A signal corresponding to K_raw is passed through a low pass filter at step 402 which removes insignificant high frequency variations in the signal, noise for example, so as to provide an initial filtered value of steady state gain K, hereinafter 'K_filtered'.

During the first few minutes of engine operation, the temperature of the fuel will rise to a working fuel temperature which will reduce the viscosity of the fuel. This will have the effect of increasing the level of leakage in the system which will have a corresponding effect of reducing the steady state gain value K. In order to compensate for the change in K due to fuel temperature changes, K_filtered is input into a temperature compensation unit 404.

Once the effects of increased fuel temperature have been removed, the K_filtered signal is passed through a high-pass filter 406 having a filter time constant in the order of minutes to provide a second filtered value of K, hereinafter 'K_high_filtered'. In turn, K_high_filtered is input into a rate of change calculation unit 408 which calculates the derivative of K_high_filtered with respect to time (hereinafter 'K'_high filtered'). Finally, the rate of change calculation unit 408 outputs the K'_high_filtered signal to a knowledge module 410.

The knowledge module 410 monitors the received value of K'_high_filtered and compares it with predetermined values of 'K'_high_filtered' that are indicative of a burst fuel supply pipe and which are stored by the knowledge module 410. For example, if a fuel supply pipe bursts, the value of K_high_filtered would drop to a low value in a matter of seconds and so the derivative value, K'_high_filtered, would be comparatively high.

If the knowledge module 410 detects a match between the received values of K'_high_filtered and the stored values of K'_high_filtered, it will send a signal to the ECU 24 so that appropriate action may be taken: for example, the ECU 24 may determine that the engine should be shut down immediately or merely that a warning signal should be issued to the vehicle operator in order to avoid damaging the engine. It should be mentioned at this point that a match between a received data values and stored data values in practice will include a degree of tolerance and a precise match is not essential. Furthermore, the knowledge module 410 may be configured to identify a match when the received data values are within predetermined limits for a period of time.

The predetermined values of K'_high_filtered stored by the knowledge module 410 are known values, or 'metrics', that are determined theoretically or, alternatively, empirically by way of engine testing. It should be appreciated that the knowledge module 410 is capable of storing a plurality of metrics for comparison such that appropriate action may be taken depending on the severity of the pipe failure. For example, if a relatively minor crack is detected by the knowledge module 410 and reported to the ECU 24, the ECU 24 may merely indicate a warning to the vehicle operator that maintenance is required. Alternatively, if a major pipe rupture is detected, the ECU 24 may cause the engine to run in a restricted power mode (limp-home mode) to enable the vehicle operator time to maneuver the vehicle to safety prior to shutting down the engine.

Determination of Mechanical Wear

Mechanical wear on the injection equipment components will increase the amount of fuel leakage from the pump/rail system 40. For instance, the clearances between surfaces exposed to high pressure fuel increase over time periods of months or years which allows the volume of fuel that leaks past such clearances to increase. This increased leakage manifests itself as a gradual decrease in the steady state gain K of the system transfer function such that, over time, it is necessary to increase the filling pulse supplied to the unit-pump 6 in order for the pressure of fuel in the common rail 4 to reach a desired level. Similarly, the unit-pump 6 will take longer to increase the pressure of fuel within the common rail 4 by a given pressure such that the time constant, T, of the pump/rail system 40 will increase. The knowledge module 410 is able to identify the effects of mechanical wear in the pump/rail system 40 by monitoring the system time constant T, the system steady state gain K and their respective rates of change, as will be described in further detail below.

The raw time constant value T_raw which is output from the system identification module 42 is input to a low pass filter 412 to remove insignificant high frequency components from the signal resulting in a filtered time constant signal (hereinafter 'T_filtered'). Thereafter, T_filtered is input directly to the knowledge module 410. In addition, T_filtered is also input into a second rate of change calculation unit 414 for calculating the derivative of T_filtered, hereafter 'T'_filtered'. The 'T'_filtered' signal is also input into the knowledge module 410.

The knowledge module 410 receives a second filtered value of K, hereinafter 'K_low_filtered', which is obtained by passing K_raw through the low pass filter 402, the temperature compensation unit 404 and a second low pass filter 416 having a filter time constant in the order of months. The output of the second low pass filter 416 is also passed though a rate of change calculation unit 418 that determines the rate of change of K_low_filtered, hereinafter K'_low_filtered, which is input into the knowledge module 410.

The knowledge module 410 monitors the values of T_filtered, T'_filtered, K_filtered and K'_filtered and compares the aforesaid values with stored values (i.e. predetermined metrics) of T_filtered, T'_filtered, K_filtered and K'_filtered that are indicative of a predetermined level of mechanical wear. Such predetermined metrics are obtained through engine proving testing. As a result of the above comparison, if the knowledge module determines a correspondence between the current and stored values of T_filtered, T'_filtered, K_filtered and K'_filtered, it transmits a signal to the ECU 24 indicating that a match has been found. The ECU 24 then takes appropriate action such as notifying the vehicle operator that a component requires replacement.

It will be understood by those who practice the invention and those skilled in the art, that various modifications and improvements may be made to the invention without departing from the scope of the invention, as defined by the claims. For example, the detection of mechanical wear in the system and burst fuel supply pipes are two types of system abnormalities that the invention is particularly suited to recognizing due to their direct influence on the characteristic parameters of the transfer function of the pump/rail system. However, it should be appreciated that the inventive concept is not limited solely to the detection of the phenomenon described. Rather, the invention is applicable to any behavioral abnormalities that may manifest themselves by variations in the characteristic parameters of the system model. For example, different grades of fuel used in an engine will have respective viscosities with which those fuels may be characterized. If a vehicle fuel tank is re-filled with a fuel having a different grade, the steady state gain value K will either increase or decrease over a few minutes (depending on whether the new fuel has a greater or lesser viscosity than the old fuel). Thus, the failure detection module 50 may be programmed with predetermined metrics to identify the derivative of K that would be expected to occur with certain fuel grades. The ECU 24 then utilizes the identification of a change in fuel grade by modifying the filling pulse appropriately to account for the change in viscosity, for example.

It should be appreciated that the fuel injection system 2 provides a context for the operation of the invention but is not intended to limit the scope of the claims. Alternatively, for example, the common rail 4 may be supplied with high pressure fuel by an equivalent pumping means, a radial high pressure fuel pump for instance.

It should also be appreciated that although the common rail 4 is described as supplying high pressure fuel to four fuel injectors 8, typically such an engine may include six, eight or ten fuel injectors.

As an alternative to monitoring the way in which the characteristics of the system model change over time in order to infer failure of system components and/or abnormal system operation, it should be appreciated that the failure detection module 50 could be modified appropriately so as to monitor the way in which the proportional, integral and derivative gain values of the controller 22 change over time in order to achieve the same advantages provided by the invention. Furthermore, the failure detection module 50 could alternatively be configured to monitor the output of the controller 22 and the way in which the output changes value over time.

The invention claimed is:

1. A method for detecting anomalous behaviour of a common rail fuel supply system of an internal combustion engine including a pressurised common rail fuel volume arranged to receive fuel from a pumping arrangement and to supply pressurised fuel to a plurality of fuel injectors and a controller arranged to monitor the pressure of fuel within the common rail fuel volume and control the output of the pumping arrangement so as to cause the pressure of fuel within the common rail fuel volume to substantially correspond to a demand rail pressure value, the method including:

determining a model of the common rail fuel supply system including a plurality of characteristic parameters to define the common rail fuel supply system; the plurality of characteristic parameters including one or more of i) a steady state gain value, ii) a system time constant value, and iii) a system time lag value;

calculating one or more metrics indicative of the current system performance of the common rail fuel supply system based on the plurality of characteristic parameters; wherein the one or more calculated metrics include values of i) the steady state gain value, ii) a rate of change of the steady state gain value, iii) the system time constant, and iv) a rate of change of the system time constant, comparing the one or more calculated metrics with one or more predetermined metrics that include one or more of i) the steady state gain value, ii) the rate of change value of the steady state gain value, iii) the system time constant value, and iv) the rate of change of the system time constant, said predetermined metrics being indicative of anomalous system behaviour of the common rail fuel supply system; and identifying a predetermined system fault condition if one or more of the calculated metrics corresponds to one or more of the predetermined metrics.

2. The method of claim 1, including controlling the common rail fuel supply system based on a plurality of predetermined system control parameters, wherein the method further includes calculating new system control parameters based on the characteristic parameters of the common rail fuel supply system and updating the predetermined system control parameters with the new system control parameters, wherein the plurality of predetermined system control parameters include one or more of i) a proportional gain value, ii) an integral gain value, and iii) a derivative gain value.

3. The method of claim 1, wherein the step of identifying a predetermined system fault condition triggers an alerting step in which a visible and/or audible alert is provided to the vehicle operator.

4. The method of claim 1, wherein one of the predetermined metrics is a value of the rate of change of the steady state gain value that is indicative of a burst fuel supply pipe of the common rail fuel supply system.

5. The method of claim 1, wherein the predetermined metrics include values of i) the steady state gain value, ii) the rate of change of the steady state gain value, iii) the system time constant, and iv) the rate of change of the system time constant that are indicative of a predetermined level of mechanical wear in the common rail fuel supply system.

6. The method of claim 1, wherein the predetermined metrics include values of the rate of change of the steady state gain value that are indicative of different fuel grades.

7. The method of claim 1, wherein the step of identifying a predetermined system fault condition triggers a change in engine power mode.

8. Apparatus for detecting anomalous behaviour of a dynamic system including a pressurised common fuel rail volume arranged to receive fuel from a pumping arrangement and to supply pressurised fuel to a plurality of fuel injectors in an internal combustion engine and a control module arranged to monitor the pressure of fuel within the common rail fuel volume and control the output of the pumping arrangement so as to cause the pressure of fuel within the common rail fuel volume to substantially correspond to a demanded rail pressure value, the apparatus including:

a system identification module for determining a system model including a plurality of characteristic parameters to define the dynamic system, the plurality of characteristic parameters including one or more of i) a steady state gain value, ii) a system time constant value, and iii) a system time lag value;

a calculation module to calculate one or more metrics indicative of the current performance of the dynamic system based on the plurality of characteristic parameters, wherein the one or more calculated metrics include values of i) the steady state gain value, ii) a rate of change of the steady state gain value, iii) the system time constant, and iv) a rate of change of the system time constant;

a storage module to store one or more predetermined metrics including one or more of i) the steady state gain value, ii) the rate of change of the steady state gain value, iii) the system time constant, and iv) the rate of change of the system time constant, that are indicative of anomalous behaviour of the dynamic system;

a comparison module for comparing the one or more predetermined metrics with the one or more calculated metrics;

an identification module for identifying that one or more of the calculated metrics corresponds to one or more of the predetermined metrics.

9. The apparatus of claim 8, wherein the control module includes a plurality of predetermined system control parameters and wherein the apparatus is further provided with a control parameter calculation module for calculating new system control parameters based on the characteristic parameters of the system such that the predetermined system control parameters may be updated with the new system control parameters, wherein the plurality of predetermined system control parameters include one or more of i) a proportional gain value, ii an integral gain value, and iii) a derivative gain value.

10. The apparatus of claim 8, wherein one of the predetermined metrics is a value of rate of change of the steady state gain value that is indicative of a burst fuel supply pipe of the dynamic system.

11. The apparatus of claim 8, wherein the predetermined metrics include values of i) the steady state gain value, ii) the rate of change of the steady state gain value, iii) the system time constant, and iv) the rate of change of the system time constant that are indicative of a predetermined level of mechanical wear in the dynamic system.

12. The apparatus of claim 8, wherein the predetermined metrics include values of the rate of change of the steady state gain value that are indicative of different fuel grades.

* * * * *